US006298821B1

(12) United States Patent
Bolonkin

(10) Patent No.: US 6,298,821 B1
(45) Date of Patent: Oct. 9, 2001

(54) BOLONKIN ROTARY ENGINE

(76) Inventor: Alexander Alexandrovich Bolonkin, 3400 W. 15th St., #42 Rosamond, CA (US) 93560

( * ) Notice: Subject to any disclaimer, the term of this patent is extended or adjusted under 35 U.S.C. 154(b) by 0 days.

(21) Appl. No.: 09/290,465

(22) Filed: Apr. 12, 1999

(51) Int. Cl.[7] .......... F02B 53/04
(52) U.S. Cl. .......... 123/228; 418/226
(58) Field of Search .......... 123/228, 229, 123/233, 249; 418/226

(56) References Cited

U.S. PATENT DOCUMENTS 2,010,797 * 8/1935 Archbold et al. .......... 123/233
2,379,838 * 7/1945 Stanzel .......... 123/249
2,944,533 * 7/1960 Park .......... 123/249
3,073,288 * 1/1963 Moriarty .......... 123/233
4,399,654 * 8/1983 David .......... 123/228
4,967,707 * 11/1990 Rogant .......... 123/228

* cited by examiner

*Primary Examiner*—Thomas Denion
*Assistant Examiner*—Tu M. Nguyen

(57) ABSTRACT

The disclosed Bolonkin rotary engine has high energy efficiency and can be used as an internal combustion engine, a compressor, a pump, or as a motor working on compressed gas or liquid. Bolonkin rotary engine comprises a housing, a rotor mounted in the housing, separating valves controlling flow of a working fluid within displacement volume of the engine, means for working fluid circulation, and means for coordinating passage of rotor blades through the separating valves. The preferred embodiment of the invention is realized as a rotary internal combustion engine having rotatable glass-shape separating valves, expansion and compression sections, and a bypass channel. Alternative preferred embodiments of Bolonkin rotary engine differ in a type of separating valve use, which can be one of the following: rotatable disc valve, reciprocating slide-slot valve, reciprocating slide valve, and a swaying-lever valve.

12 Claims, 13 Drawing Sheets

BOLONKIN ROTARY ENGINE

BACKGROUND OF THE INVENTION

1. Field of Invention

This invention relates to rotary apparatuses, specifically to rotary combustion engines, rotary pumps, rotary compressors, and rotary motors.

2. Description of the Related Art

A rotary apparatus serves as a foundation of various internal combustion engines, pumps, and motors. Hundreds of patents have been issued in the United States alone for inventions of various rotary engines. Such a flood of inventions is not accidental as it is a known fact that about fifty percent of U.S. domestic oil consumption goes into automotive fuel, while fuel efficiency of commercial internal combustion engines is below 50 percent. Therefore, even a several percent improvement in fuel efficiency of internal combustion engines would be an economically justifiable goal. All attempts of prior art in the field of internal combustion engines have been directed to such a goal. Yet, it is also a well known fact that the reciprocal piston internal combustion engines have practically reached their technical/ecological limits in fuel efficiency, size, weight, specific power. The crankshaft and connecting rod mechanisms create a bottleneck that prevents reaching higher compression ratio (i.e. higher efficiency). Pressure value that combustion gas can exert on the total surface of a reciprocating piston is limited by the material strength of the connecting-rod and crankshaft. Reciprocal inertial movements of the piston and connecting-rod cause high inertial loads in the mechanical parts of a reciprocating piston engine, limiting high revolution rate (high specific power). Moreover, the connecting-rod passes large dynamic force onto the piston/cylinder boundary surface, which results in friction heat that accounts 8 to 15 percent in fuel waste and requires complicated lubrication and cooling system of engine cylinders to prevent burning of the engine oil. All this adds extra complexity, materials, and cost in traditional internal combustion engines.

Prior art discloses rotary engines in which rotors have radiancy or axially movable blades or fans which exert large mechanical pressure on the movable contact surfaces of the blades, complicating the rotary engine design. Known in prior art are also planetary rotary engines, yet in these designs the engine's rotor must perform complicated spatial rotations around more than one axis.

There are many various internal combustion rotary engine inventions, but only the Wankel rotor engine has been so far commercially manufactured to some extended degree. The Wankel's engine however has many disadvantages. For example, the spinning of the Wankel's engine is not uniform and the compression ratio is very limited. Therefore the high power density and the fuel savings are not obtainable in the Wankel engine. The Wankel engine has an extended combustion chamber that leads to incomplete fuel combustion and harmful exhaust into the atmosphere. In the Wankel engine, the rotor's pressure on the stator not only limits large compression ratio of the engine but also produces a lot of friction heat that requires intensive cooling of the rotor.

SUMMARY OF THE INVENTION

The goal of the disclosed invention is the elimination of drawbacks of current commercial internal combustion engines, pumps, and compressors, leading to better fuel economy, increase of specific power, increase in engine's rotation speed, reduction in size, weight, and construction simplification. The stated objectives are reached in the disclosed preferred embodiments of the present invention.

The main parts of the rotary engine are a housing, a rotor, and separating valves. The housing encloses the rotatable rotor and separating valves. The separating valves partition the engine displacement volume into intake/compression sections and expansion/exhaust sections. Depending on an engine embodiment the separating vales perform either rotatable or reciprocating movement. The rotor performs simple rotation around its shaft axis. The rotor has a plurality of radially extended blades, also called protrusions or protuberances. The rotor blades extends substantially perpendicular to the rotor's peripheral surface.

The rotor peripheral profile features a plurality of blades spaced around the rotor. In some designs of the rotor, the rotor has its peripheral geometry precisely shaped to obtain required blades. In other designs, rotor blades can be made as separate parts which are assembled with the rotor, i.e. attached immovably to the rotor.

Depending on an engine embodiment and/or ramification, separating valves can be one of the following: a glass-shape valve, a disc valve, a slide-slot valve, a slide valve, or a swaying-lever valve. The peripheral surface of the rotor, the inside concave surface of the housing, and the external surfaces of the separating valves, in combination, define a plurality of the compression and expansion sections of the rotary engine.

A bypass channel is used in the engine to convey a working fluid from the engine compression section into the engine expansion section. The bypass channel can be located inside the rotor's body, or a bypass channel can be placed on the housing wall. In the latter case, a combustion chamber can be accommodated inside of the bypass channel.

The inventive rotary engine is distinguished for its high energy efficiency, small dimensions, and lower weight. The engine design allows ceramic isolation of internal engine surfaces which are exposed to hot combustion gases. The engine can use standard automotive fuel as well as heavy petroleum fuels.

The novel features which are considered as characteristic for the present invention are set forth in particular in the appended claims. The invention itself, however, both as to its construction and its method of operation, together with additional objects and advantages thereof, will be best understood from the following specification and description of specific embodiments when read in connection with the accompanying drawing.

BRIEF DESCRIPTION OF THE DRAWINGS

FIG. 6*a*1 is a principal scheme of a rotary engine having two glass-shape separating valves.

FIG. 6*b*1 is a principal scheme of a rotary engine with four glass-shape separating valves.

FIG. 6*c*1 is a principal scheme of a rotary engine having separate compression and expansion compartments and glass-shape valves.

FIG. 6*a* is an unfolded cyclogram of the rotary engine with two glass-shape separating valves. Notations on the cyclogram are as follows: 42—unfolded rotor surface, 3—rotor blade, 4—rotating glass-shape separating valve, A—air intake pipe, B—compression section, C—a working fluid flow bypass direction from the compression section into the expansion section, D—expansion section, E—exhaust gas pipe.

FIG. 6*b* is an unfolded cyclogram of the rotary engine with four glass-shape separating valves. Notations are same as in FIG. 6*a*.

FIG. 6*c* is an unfolded cyclograms of the rotary engine having a separate compression compartment and a separate expansion compartment, each compartment has a rotor and one glass-shape separating valve. Notations are same as in FIG. 6*a*.

FIG. 7*a*1. is a principal scheme of a rotary engine having two slide-slot valves.

FIG. 7*a*2. is a principal scheme of a rotary engine having four slide-slot valves.

FIG. 7*a*3. is a principal scheme of a rotary engine having a separate compression compartment and a separate expansion compartment, each compartment having a rotor and a slide-slot separating valve.

FIG. 7*a* is an unfolded cyclogram of a rotary engine having two slide separating valves.

FIG. 7*b* is an unfolded cyclogram of a rotary engine having four slide-slot separating valves. The cyclogram notations are same as in FIG. 6*a*.

FIG. 7*c*. is an unfolded cyclogram of a rotary engine having a separate compression and a separate expansion compartments, each compartment having a rotor and a slide-slot separating valve. The cyclogram notations are same as in FIG. 6*a*.

FIG. 8*a*1 is a principal scheme of a rotary engine having two slide separating vales moving substantially perpendicular to the rotor peripheral surface. F—an external bypass channel having bypass valves, the channel may serve as an external combustion chamber.

FIG. 8*b*1 is a principal scheme of a rotary engine with four slide separating valves.

FIG. 8*c*1 is a principal scheme of the rotary engine with separate compression and expansion compartments, each compartment having a rotor and a slide separating valve reciprocating substantially, parallel to the rotor peripheral surface.

FIG. 8*a* is an unfolded cyclogram of a rotary engine with two slide separating valves reciprocating along the rotor radius. Notations are same as in FIG. 6*a*.

FIG. 8*b* is an unfolded cyclogram of a rotary engine having four slide separating valves reciprocating along the rotor radius. Notations are same as in FIG. 6*a*.

FIG. 8*c* is an unfolded cyclogram of a variant of the rotary engine with separate compression and expansion compartments, each compartment having a rotor and a slide separating valve.

FIG. 9*a*1 is a principal scheme of a rotary engine embodiment having two disc separating valves.

FIG. 9*b*1 is a principal scheme of a variant of a rotary engine with separate compression and expansion compartments having one rotor and two disc separating valves in each compartment.

FIG. 9*a* is an unfolded cyclogram of a rotary engine embodiment having two rotating flat disc valves. Notations are the same as in FIG. 6*a*.

FIG. 9*b* is an unfolded cyclogram of a rotary engine with separate compression and expansion compartments, each compartment having a rotor and two rotatable disc separating valves. Other notations are similar to those of FIG. 6*a*.

FIG. 10*a*1 is a principal scheme of a gas/liquid pump or a motor apparatus with a rotatable glass-shape separating valve.

FIG. 10*b*1 is a principal scheme of a gas/liquid pump or a motor apparatus with a reciprocating slide separating valve or a rotatable disc separating valve.

FIG. 10*c*1 is a principal scheme of a gas/liquid pump or a motor apparatus with a slide valve reciprocating substantially along the rotor's radius.

FIG. 10*a* is an unfolded cyclogram of a gas/liquid pump or a motor apparatus having a glass-shape separating valve. Notations are same as in FIG. 6*a*.

FIG. 10*b* is an unfolded cyclogram a gas/liquid pump or a motor apparatus having a reciprocating slide separating valve or a rotating disc separating valve. Notations are same as in FIG. 6*a*.

FIG. 10*c*. is an unfolded cyclogram of a gas/liquid pump or a motor apparatus with a slide plate valve reciprocating substantially along the rotor's radius. Notations are same as in FIG. 6*a*.

FIGS. 12*a*1 and 12*a*2 are two-projection views of a design of a bypass channel located in the rotor's body.

FIGS. 12*b*1, 12*b*2, and 12*b*3 are three-projection views of a design of a bypass channel located on the housing.

DETAILED DESCRIPTION OF PREFERRED EMBODIMENTS OF THE INVENTION

Figure 1:
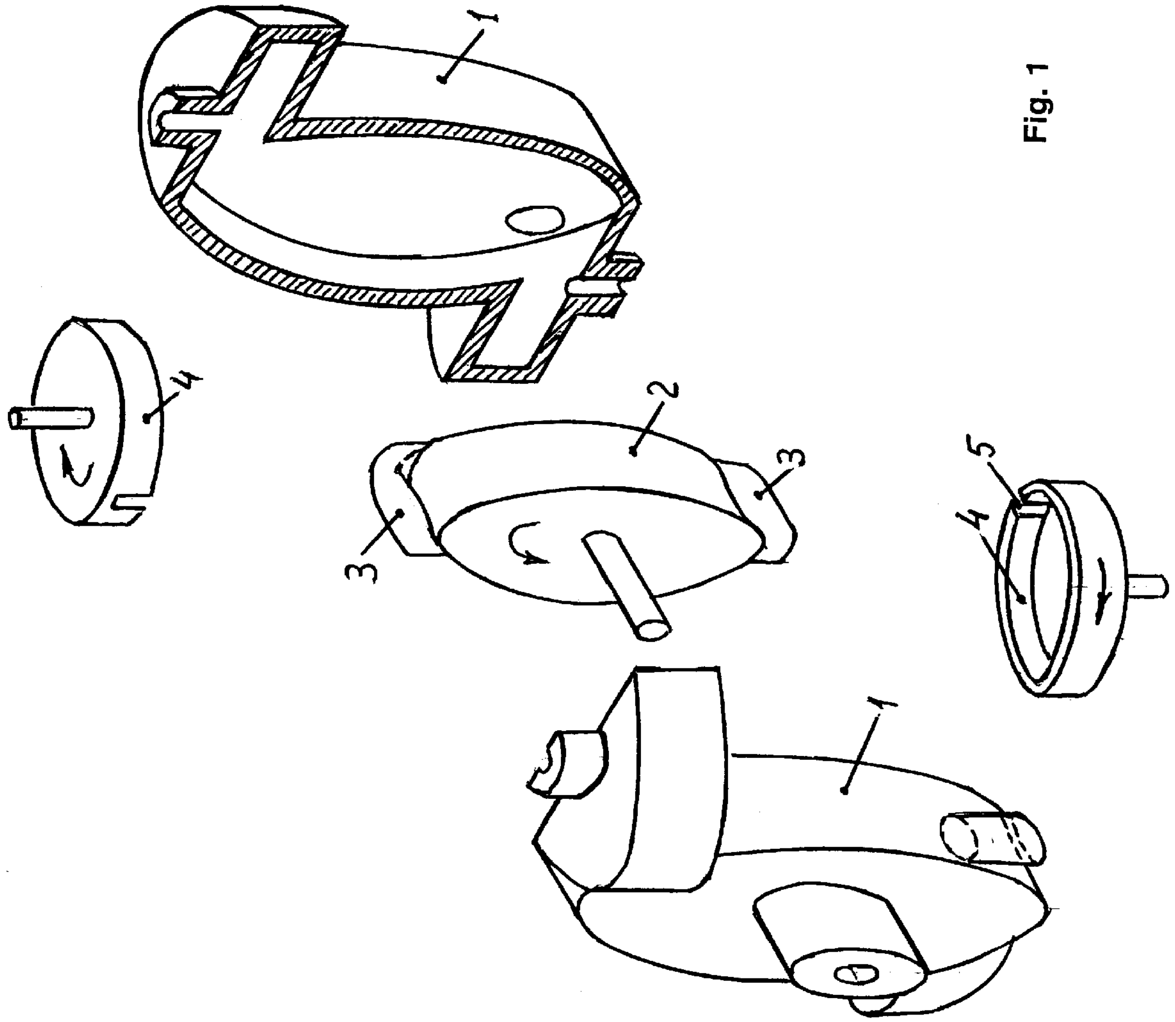
FIG. 1 illustrates a preferred embodiment of the rotary engine with glass-shape separating valves.
Figures 6, 6A, 6B, 6C:
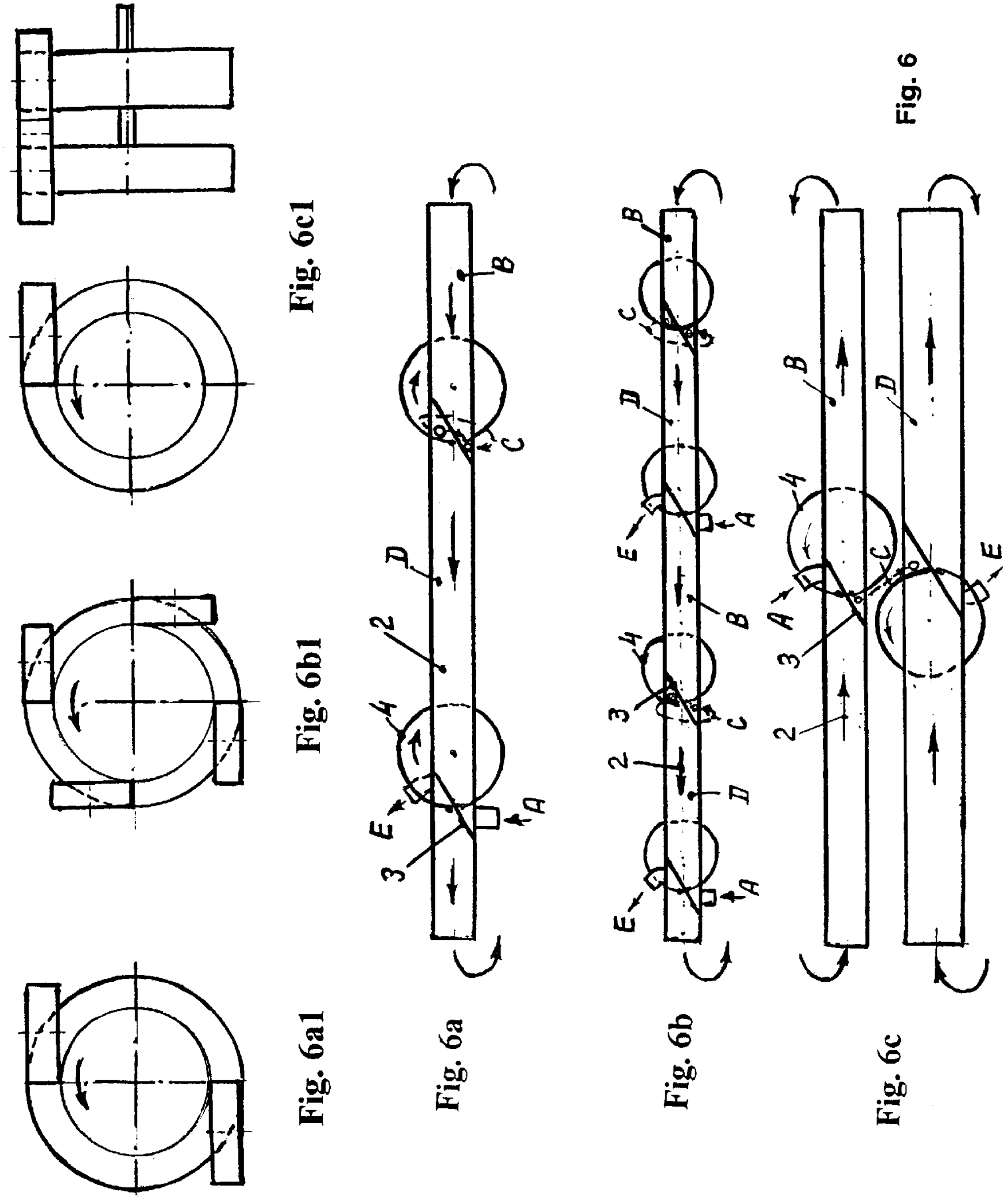
Figures 7A, 7B, 7C:
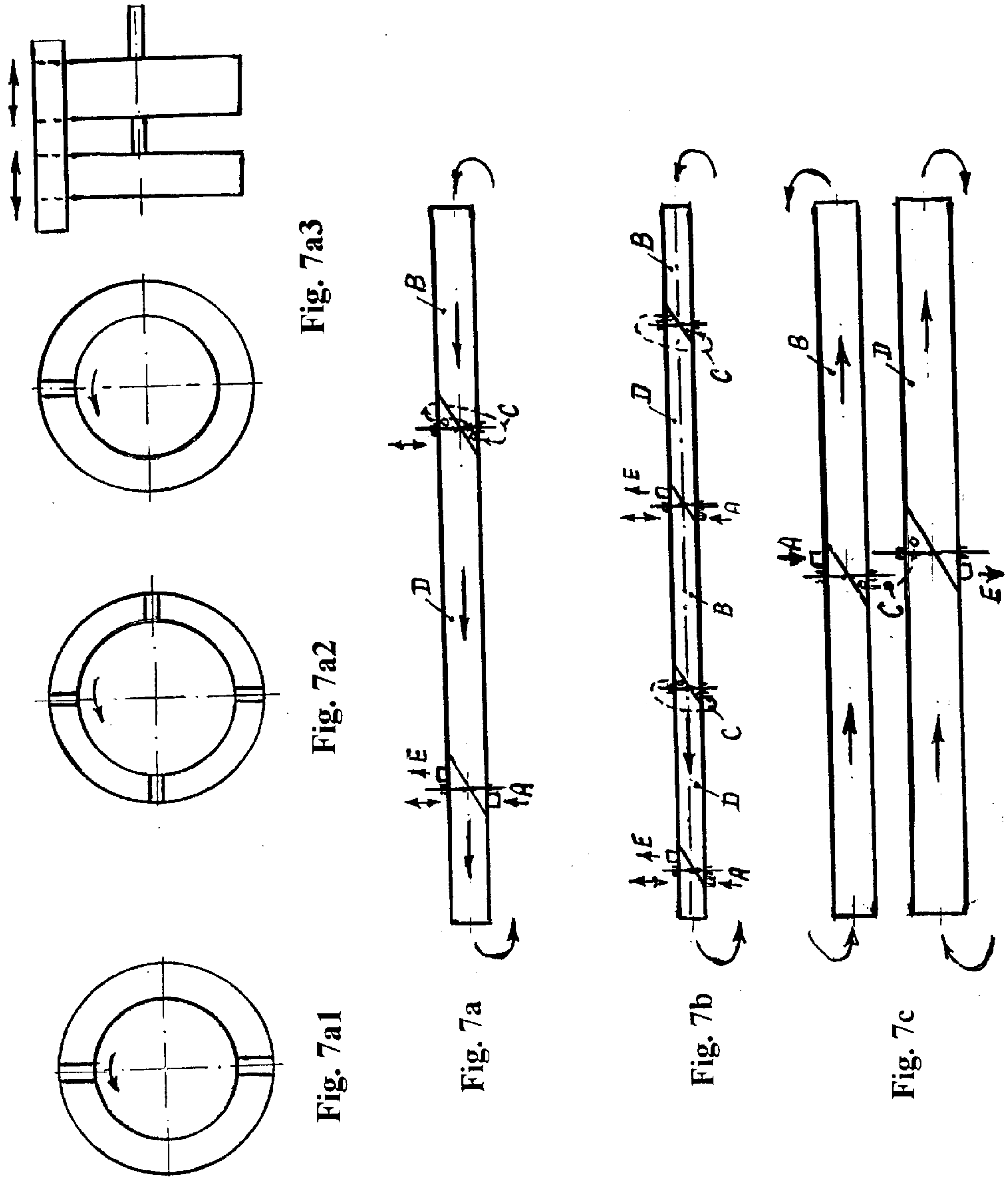
Figures 8, 8A, 8B, 8C:
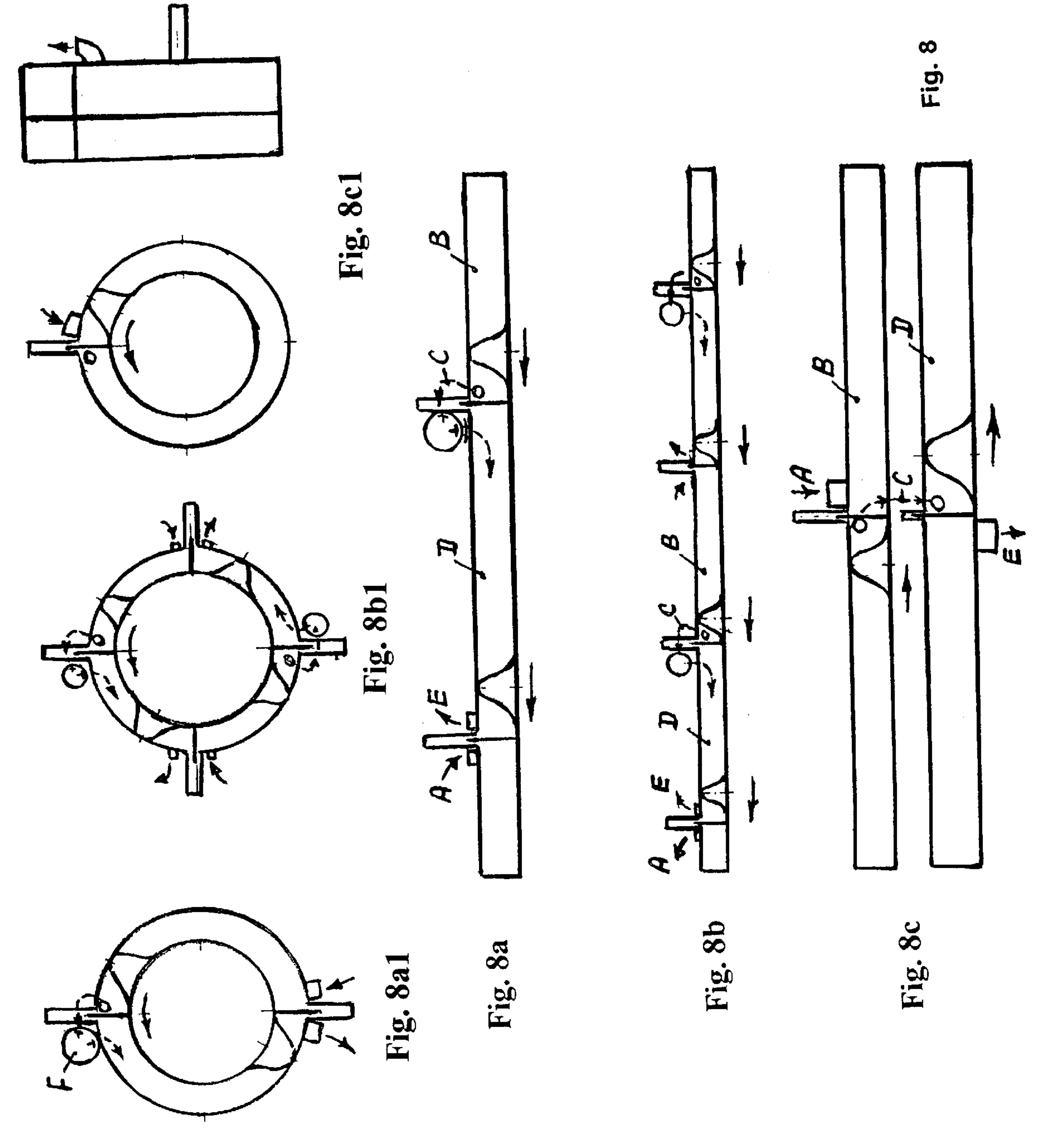
Figure 9A:
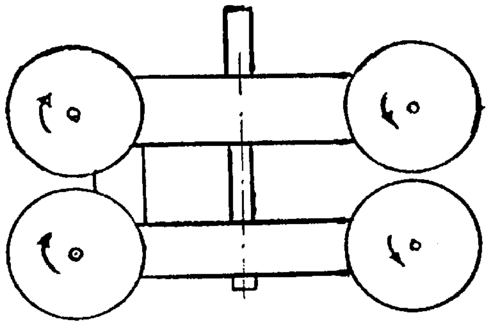
Figure 9A:
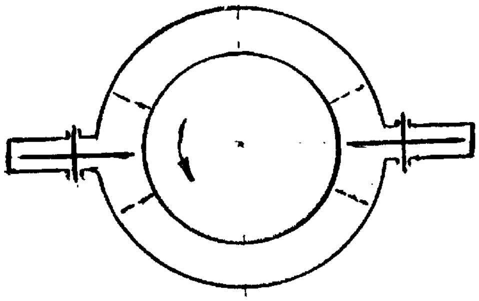
Figure 9A:
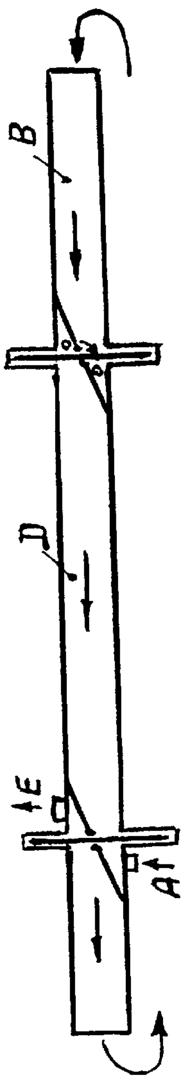
Figure 9B:
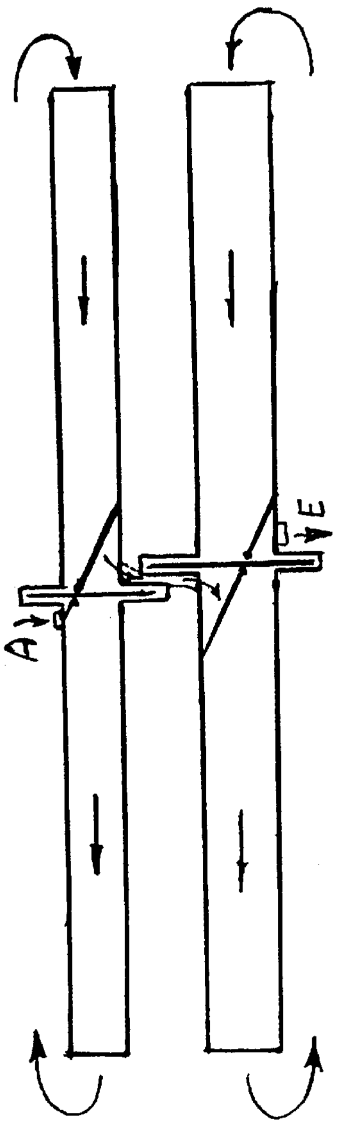

FIG. 1 illustrates a preferred embodiment of Bolonkin rotary engine which comprises housing 1, rotor 2 having blades 3 protruding out of peripheral surface 42 of the rotor. Because of its shape, valve 4 shall be called a glass-shape separating valve. Working surface 41 of valve 4 is proximal to peripheral surface 42 of the rotor. A rotor blade passes through glass-shape separating valve 4 via slot 5. An engine has a bypass channel (not shown on FIG. 1) for passage of compressed gas from the compression section into the expansion section. Principal schemes and cyclograms for the three variants of the preferred embodiment of Bolonkin engine are shown in FIGS. 6*a*1, 6*b*1, 6*c*1 and FIGS. 6*a*, 6*b*, 6*c* correspondingly. In notations of these figures, letter "a" denotes an engine variant with two separating valves, letter "b" denotes an engine variant with four separating valves, and "c" denotes an engine variant with separate compression and expansion compartments. The cyclogram of FIG. 6*a* shows rotor's peripheral surface 42 unfolded into a straight band, rotor blade 3, separating valve 4, air intake duct A, compression section B, expansion section D, and exhaust gas duct E. Cyclograms of the engine variants shown in FIG. 6*b* and FIG. 6*c* have similar markings.

Figure 11:
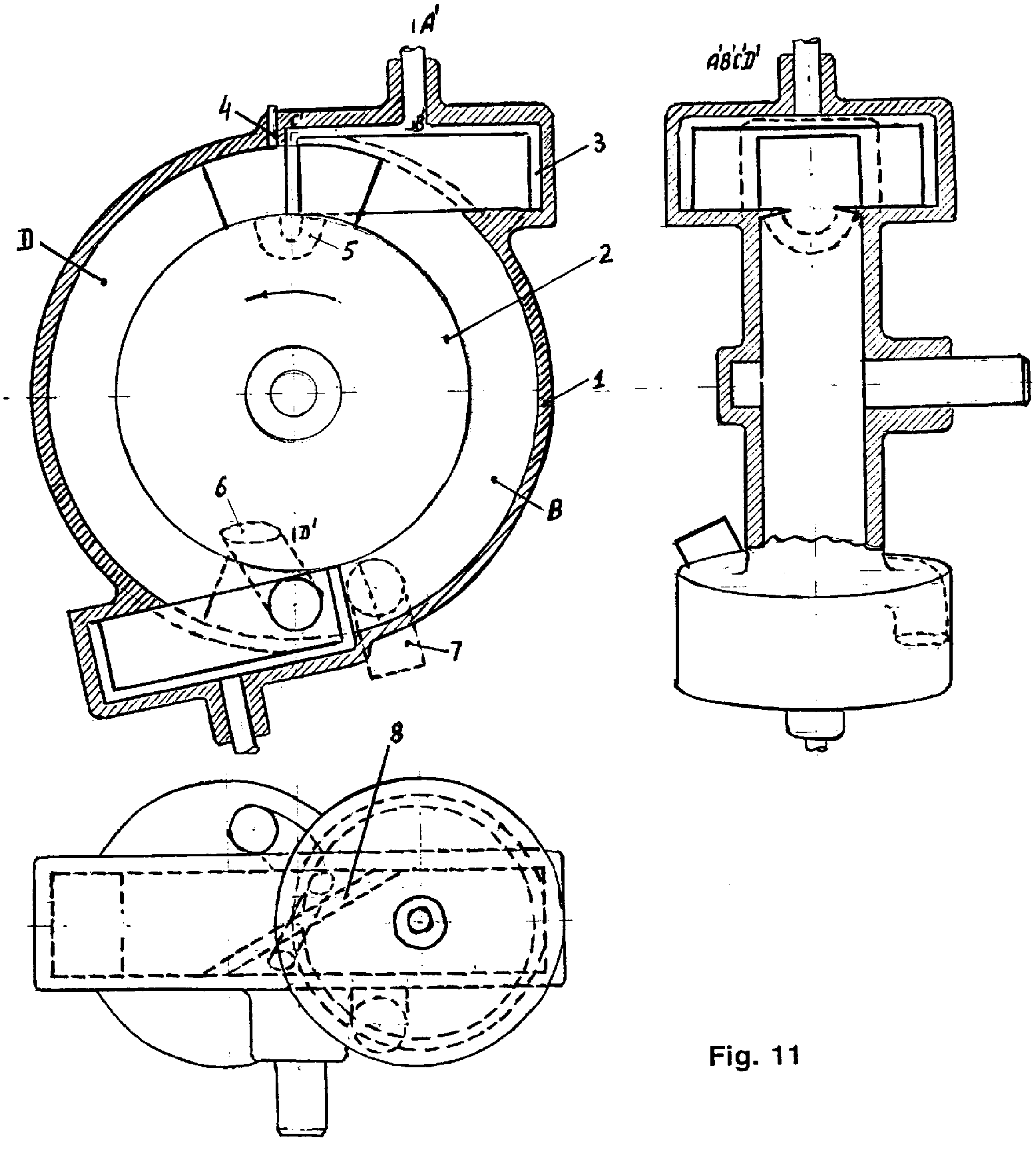
FIG. 11 is a three projection drawing of a preferred embodiment of an internal combustion rotary engine having glass-shape separating valves.

FIG. 11 shows in greater detail front, top, and side views a preferred embodiment of Bolonkin internal combustion rotary engine having glass-shape separating valves. The engine has housing 1, rotor 2, first separating valve 31, second separating valve 32, fuel burner 6, bypass channel 7, exhaust gas duct 9, air intake duct 8, and rotor blades 3. Separating valve 31 is positioned asymmetrically relatively to separating valve 32 and is displaced more outward from the housing in order to make volume of the engine expansion section D larger than volume of the engine compression section B, facilitating more complete expansion of hot combustion gases and better fuel efficiency of Bolonkin rotary engine in comparison with a reciprocal piston engine in which compression and expansion volumes are always the same.

Passage of a working fluid from the compression section to the expansion section is illustrated next in FIGS. 12*a*1, 12*a*2, 12*b*1, 12*b*2, and 12*b*3.

Figure 2:
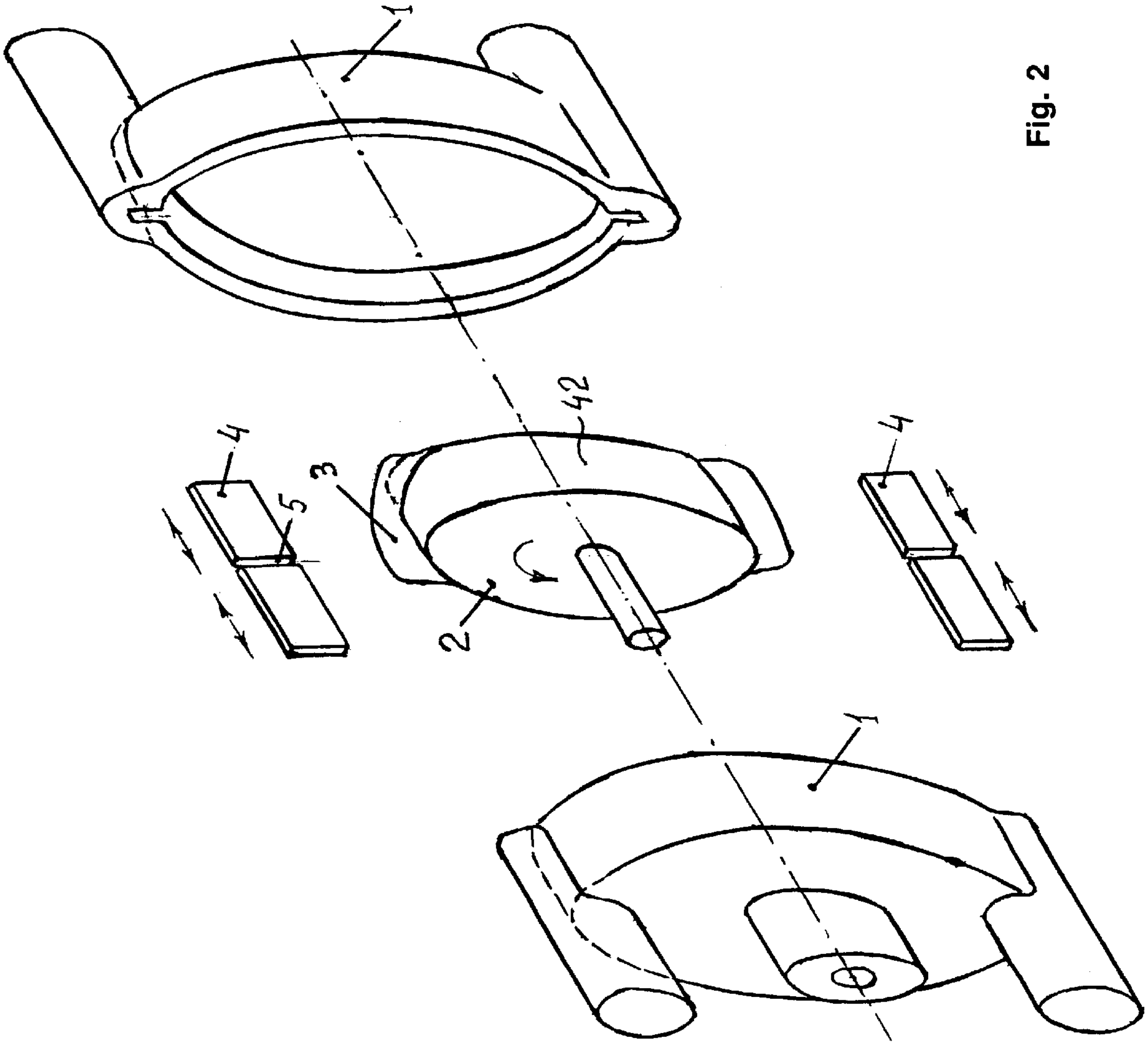
FIG. 2 shows an alternative preferred embodiment of the rotary engine having slide-slot separating valves reciprocating substantially parallel to the rotor peripheral surface.

FIGS. 12*a*1 and 12*a*2 show two-projection views design of an internal bypass channel inside of the rotor body. The rotary engine housing has two flanges 12 having opening 1 and opening 2. The bypass channel 7 is made within the rotor's body. Passage of a working fluid from compression section B into expansion section D takes place when two openings in housing flanges 12 overlap with corresponding two openings 11 of the bypass channel 7, and the compressed air is expelled from section B, via bypass channel 7, into section D in which fuel is injected through burner 6.

FIGS. 12*b*1, 12*b*2, and 12*b*3 are three-projection views of an exemplary design of the external bypass channel on the housing. The construction of the bypass channel on the housing has an advantage because it allows placing combustion chamber CC and fuel burner 6 inside of bypass channel 7. The location of the combustion chamber within the bypass channel and large volume of the combustion chamber makes it possible for the engine to run a constant pressure thermodynamic cycle with a steady slow combustion of heavy fuels at a very wide range of the rotor's revolution speed. Moreover, the combustion chamber can be made of, or have its internal surface covered with, a ceramic material which would reduce heat loss and thermal fatigue in the walls of the combustion chamber.

Figure 12C:
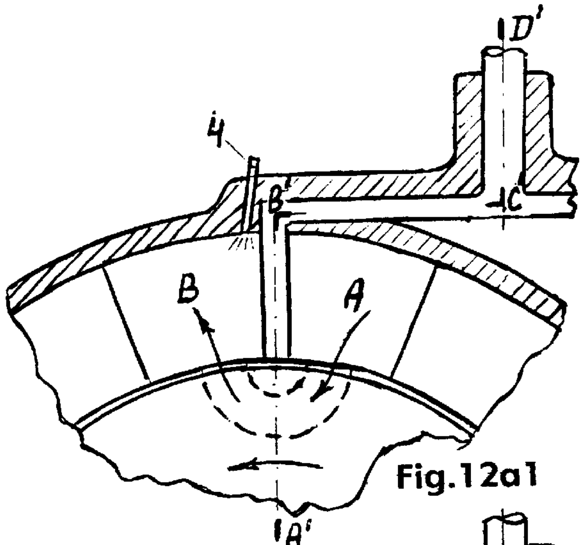
FIG. 12*c* is the bypass channel in a rotary engine embodiment having separate compression and expansion compartments.
Figure 12C:
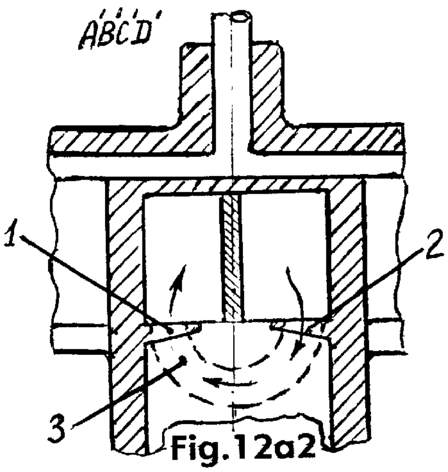
Figure 12C:
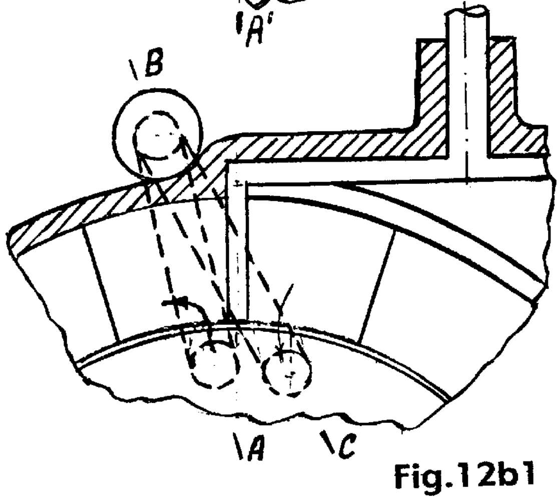
Figure 12C:
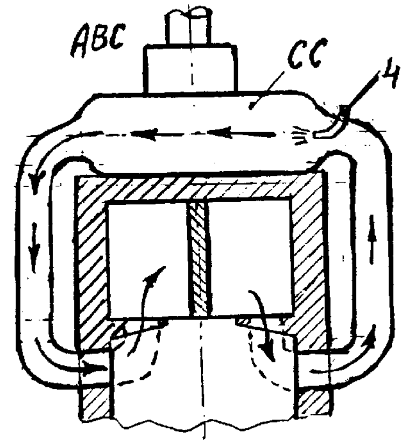
Figure 12C:
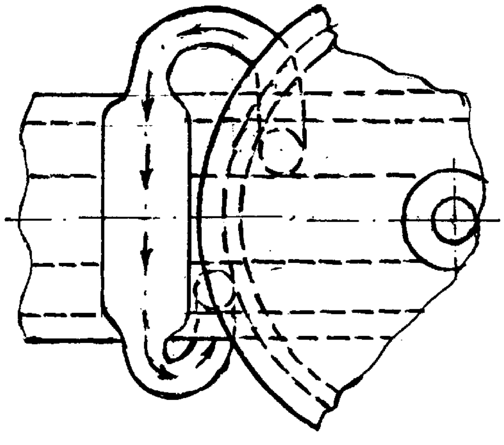
Figure 12C:
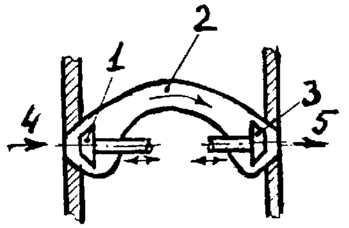

FIG. 12*c* illustrates a design of a bypass channel in the alternative preferred embodiment of Bolonkin rotary engine having separate compression and expansion compartments. Valves 13 in bypass channel 7 control a working fluid flow through bypass channel 7, from compression compartment side 14 to expansion compartment side 15. When desired, a combustion chamber can be accommodated inside of bypass channel 7.

Figure 13F:
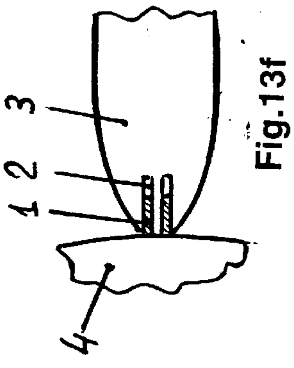
FIG. 13*f* is a design of seals for separating valves.
Figure 13D:
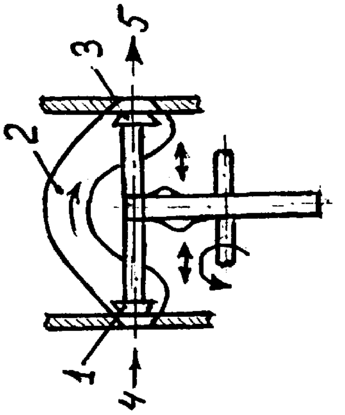
FIG. 13*d* is a design of a cam drive to control bypass channel inlet and outlet valves.

Several designs of a separating valve drive can be used in preferred embodiments of disclosed Bolonkin rotary engine. FIG. 13*a* shows one design of a drive gear for the glass-shape separating valve. Engine rotor 2 has a plurality of curvilinear tooth gear 18, and separating valves 31 and 32 have a plurality of slits 22. As rotor 2 rotates, each tooth gear 18 rotatably grapples into a corresponding slit 22 and rotates separating valves 31 and 32 like a worm gear.

Turning again to FIG. 11, Bolonkin rotary engine work cycle is described. Rotor 2 rotates counterclockwise in the engine housing 1. Start from a position of the rotor when its blade 3 has just passed through separating valve 31. With the rotor rotating counterclockwise, the engine intakes air through intake duct 8 into compression section B. Simultaneously, at another side of the same blade 3, the air in displacement volume B is compressed. After about a half turn of the rotor, the rotor blade approaches separating valve 32 and the bypass channel 7 opens and the compressed air is expelled from compression section B into expansion section D where fuel is injected into the compressed air by the burner 6. By now the rotor blade has passed through the separating valve 32 and entered the engine expansion section D. As fuel burns, the hot expanding gas exerts pressure on the rotor blade and rotates the rotor, while simultaneously the exhaust gas, left in the expansion section D from the previous engine cycle, is expelled through exhaust duct 9 by the blade of the rotating rotor. After about another half turn, the rotor blade comes near the separation valve 31 where it clears exhaust duct 9. Further passing of the rotor blade through separating valve 31 completes the engine work cycle. After that, the engine work cycle is repeated. With a two blade rotor, the engine performs two compression/intake and two expansion/exhaust operations in one work cycle.

Turning now to FIG. 2, an alternative preferred embodiment of Bolonkin engine is illustrated. This embodiment uses a slide-slot separating valve which reciprocates along direction (shown by arrows) of the rotor axis.

Figure 3:
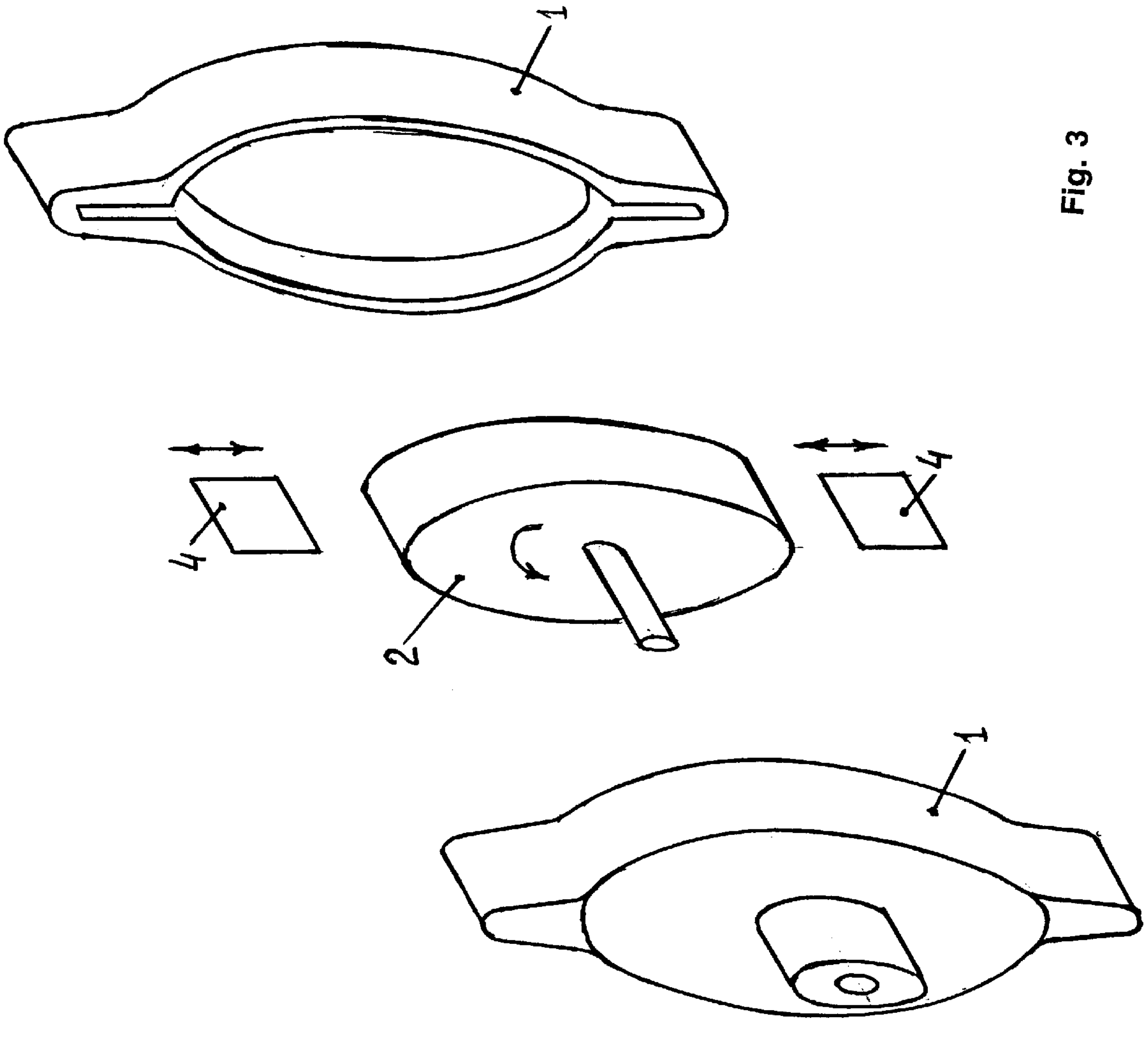
FIG. 3 illustrates an alternative preferred embodiment of the rotary engine having slide separating valves reciprocating substantially perpendicular to the peripheral surface of the rotor.

FIG. 3 shows still an alternative preferred embodiment of Bolonkin rotary engine having an oval rotor and a slide separating valve. The slide separating valve represents a substantially rectangular plate which reciprocates in direction (shown by arrows) substantially perpendicular to the rotors peripheral edge.

Figure 5:
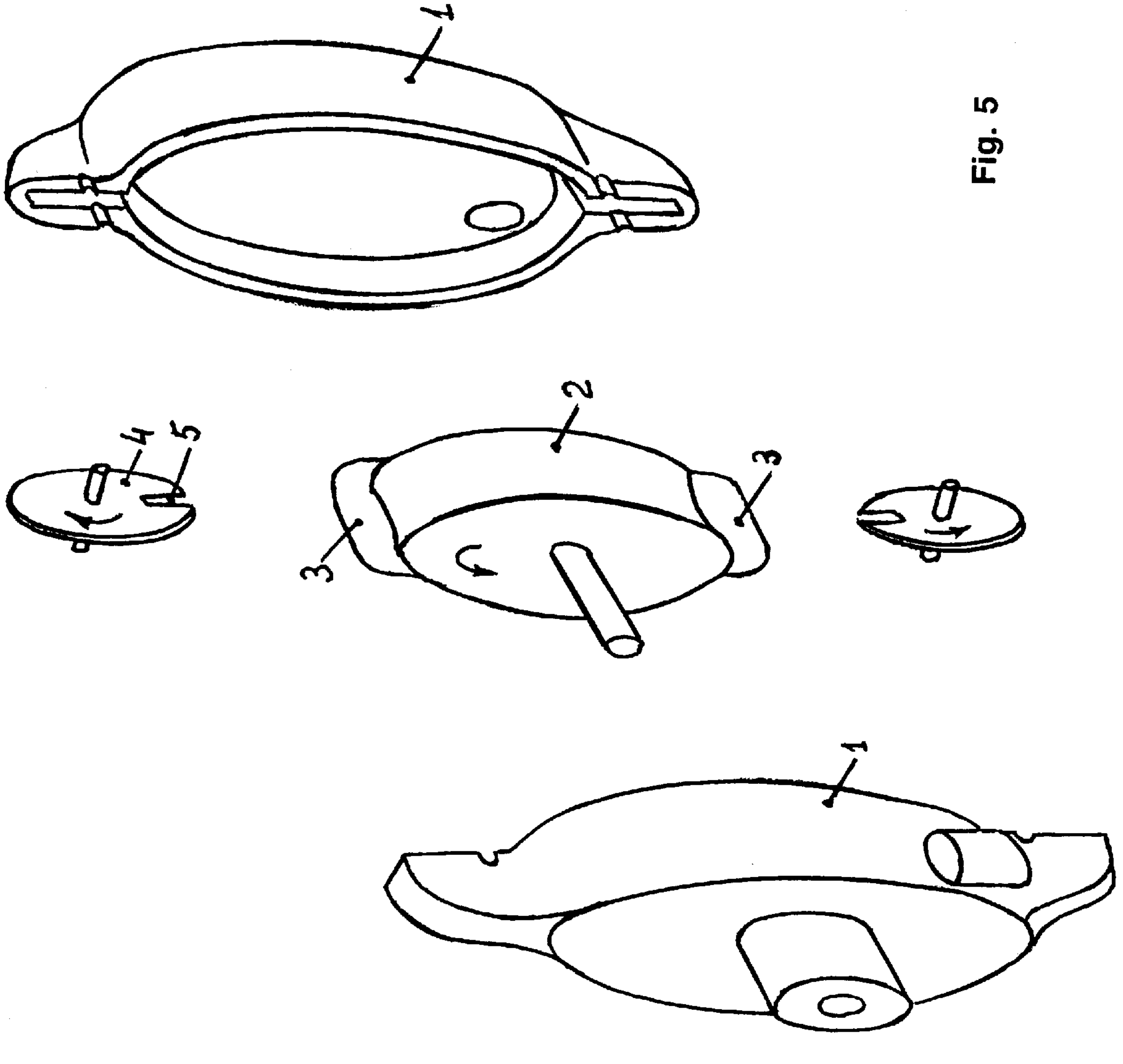
FIG. 5 illustrates an alternative preferred embodiment of the rotary engine having rotatable disc separating valves.

FIG. 5 shows an alternative preferred engine embodiment of Bolonkin rotary engine having a rotatable disc separating valve Rotor 2 is rotatably disposed on axle 51 inside housing 1. Rotation axle 52 of disc separating valve 4 is substantially perpendicular to rotation axle 51 of rotor 2. Disc separating valve 4 has a slot 5 for rotatable passage of rotor blade 3. As disc valve 4 rotates, its working edge 41 is sliding proximally to peripheral surface 42 of rotor 2 whereby providing for pressurizing of the working volume of the engine.

Figure 13E:
FIG. 13*e* is a design of a cam drive for a sway-lever separating valve.

One more alternative preferred embodiment of the rotary engine uses a swaying level separating valve shown in FIG. 13*e*. It must be noted that all versions of the proposed engine can have a two compartment variant exemplified in FIG. 4. The principal difference among the alternative preferred embodiments of the disclosed engine is only in a type of a separating valve used.

Each version of the proposed rotary apparatus can also be implemented as a compressed gas/liquid pump or a motor having a plurality of separating valves. Principal schemes and unfolded cyclograms of the disclosed invention realized as a pump or a motor are shown in FIGS. 10*a*1, 10*b*1, 10*c*1 and FIGS. 10*a*, 10*b*, 10*c* correspondingly.

Figure 13B:
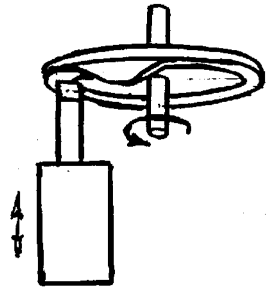
FIG. 13*b* is a design of a cam drive for a slide separating valve.
Figure 13C:
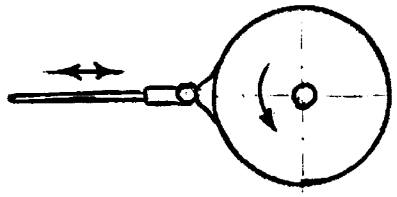
FIG. 13*c* is another design of a cam drive for a slide separating valve.
Figure 13A:
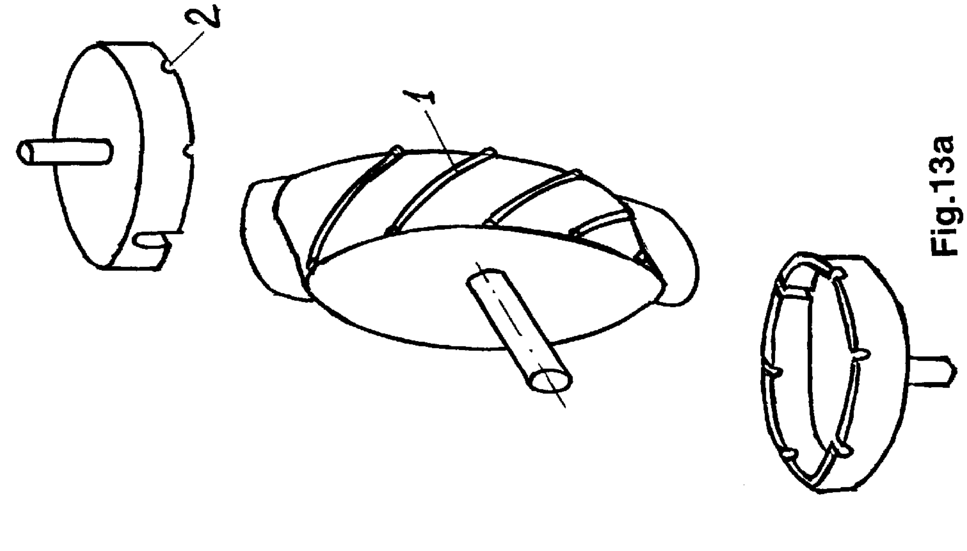
FIG. 13*a* is a design of a separating valve drive for the glass-shape separating valve.

FIG. 13*b* and FIG. 13*c* each exemplifies a cam drive for driving a slide separating valve. FIG. 13*d* shows a design of the bypass channel elements of the rotary engine variant with separate compression and separate expansion compartments. Two bypass valves 13 are provided for controlled flow of a working fluid via the bypass channel 7. The compressed working fluid enters from the compression compartment side 14 (compression rotor apparatus) and flows into the expansion compartment 15 (expansion rotor apparatus). In his design it is possible to place a combustion chamber inside the bypass channel 7 and burn heavy fuels.

FIG. 13*e* is an exemplary design of a swaying separating valve driven by a simple cam mechanism. Such a design greatly reduces the separating valve friction.

FIG. 13*f* shows use of spring-controlled seals to pressurize displacement volumes of compression and expansion sections of the rotary engine. Separating valve 20 has seals 21 slightly touching surface 19 of the rotary engine rotor. Seal 21 is controlled by spring 23.

In Bolonkin rotary engine having glass-shape, slide-slot, or rotating disc separating valves, the rotor blades have curvilinear geometry providing for congruent passage of the rotor blades through the slot of the separating valve, so that the movement of the rotor blades through the separating valve is coordinated with the rotation of the separating valves.

A separating valve has a working edge which is sliding proximally to the peripheral surface of the rotor, providing engine pressurization with possible use of one or more pressurizing seals.

Figure 4:
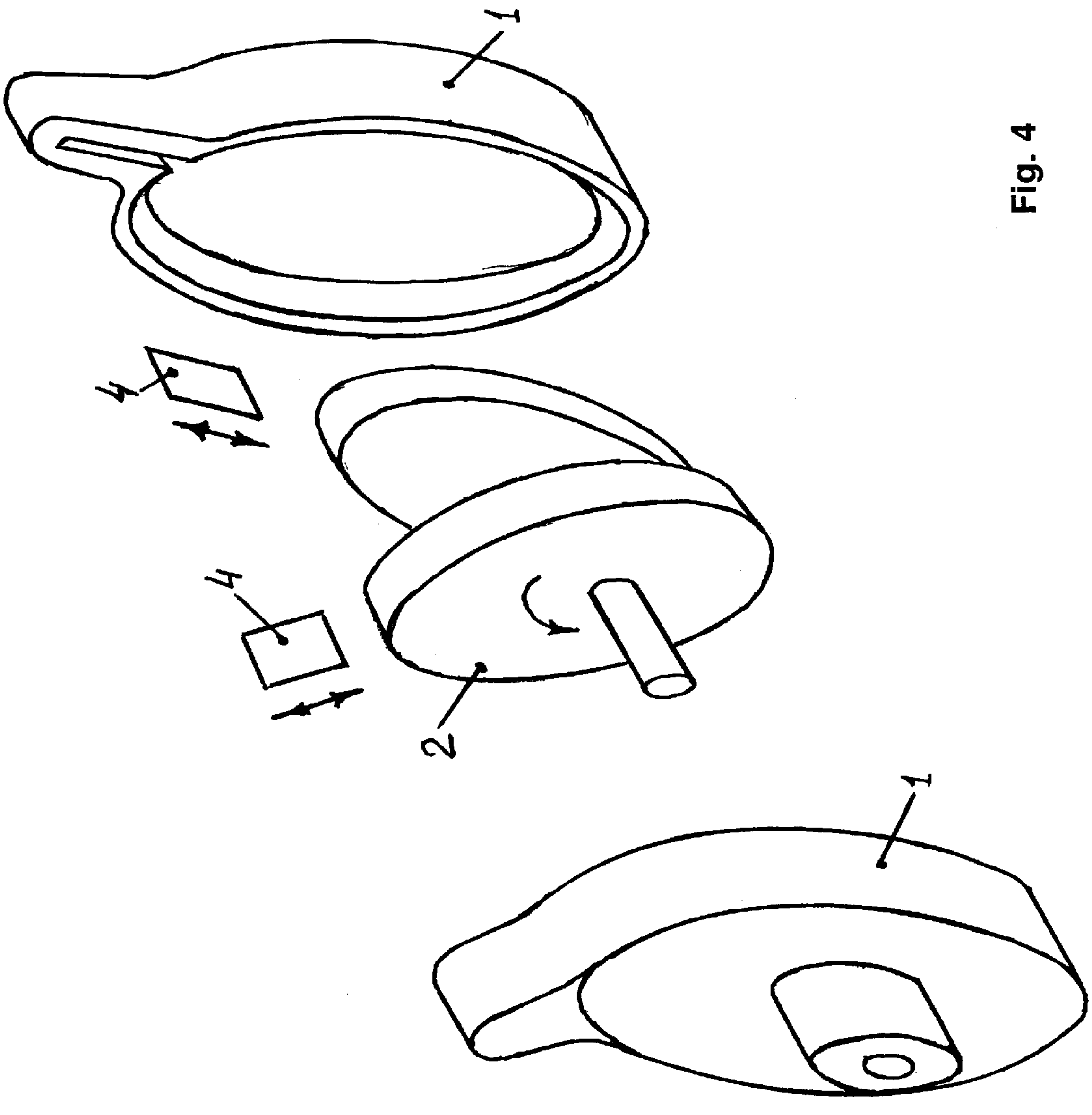
FIG. 4 illustrates an alternative preferred embodiment of the rotary engine having separate compression and expansion compartments with a rotor and a separating valve in each compartment.

Three alternative preferred embodiments of the engine, shown in FIG. 2, FIG. 3, and FIG. 4, have reciprocating slide separating vanes. The variants of the engine embodiments with separate compression and expansion compartments work similarly, each compartment having a separate rotor and a separating valve, as illustrated in FIG. 4. Ramifications of the inventive rotary engine differ in how bypass of the compressed working fluid takes place from the compression section into the expansion section. The working fluid can bypass via an external bypass channel, as illustrated by FIGS. 12*b*1, 12*b*2, and 12*b*3 or via a special internal bypass channel located within the body of the engine between the compartments as shown in FIG. 12*c*.

All alternative preferred embodiments of the disclosed rotary engine can have a ramification with separate compression and expansion compartment, each of the compartments hating its own rotor and a separating valve. A working fluid is compressed in the compression compartment and passes via a bypass channel into the expansion compartment where it expands.

The proposed engine apparatus can be embodied as a pump or as a machine working on compressed gas or liquid. The preferred alternative embodiments or versions of the rotary engine differ only in a type of separate valve.

Figure 10A:
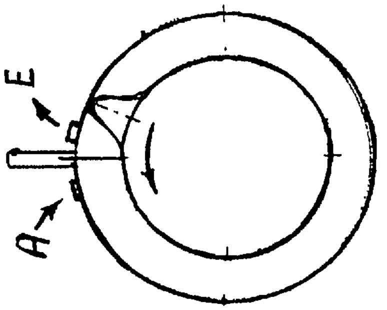
Figure 10A:
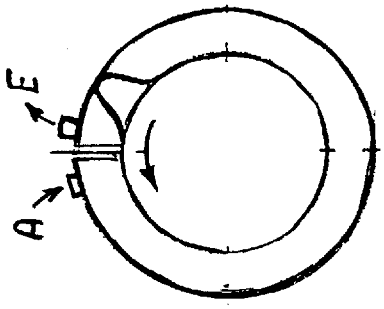
Figure 10A:
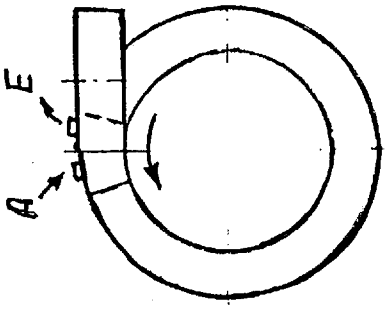
Figure 10A:
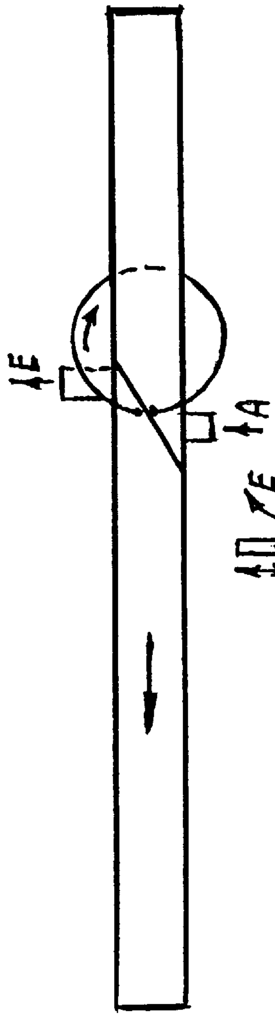
Figure 10B:
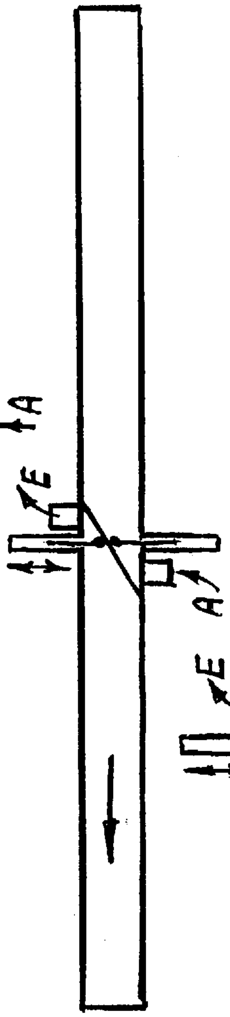
Figure 10C:
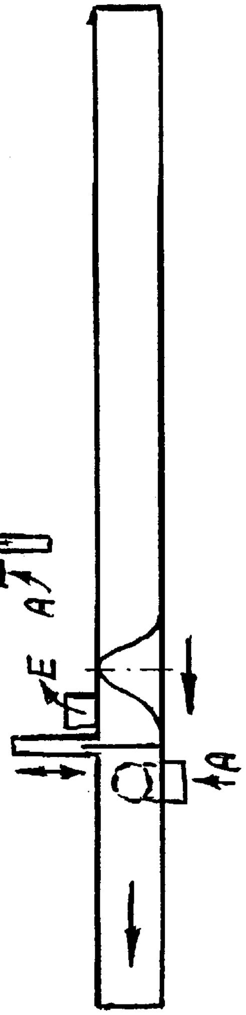

Principal schemes for pump/motor variants of the disclosed rotary apparatus are shown in FIG. 10*a*1 (one glass-shape separating valve), FIG. 10*b*1 (one slide-slot or one rotating disc separating valve), and FIG. 10*c*1 (one slide separating valve). Unfolded cyclograms for the same embodiments of the rotary pump/motor are shown in FIG. 10*a*, FIG. 10*b*, and FIG. 10*c* correspondingly. As a pump, the device sucks in fluid (gas or liquid) through entry duct A and, after being compressed in the pump, the working fluid under pressure exits via exit duct E. When the rotary apparatus of the disclosed invention is used as a motor, a working fluid under pressure enters the motor through entry duct A and acts on the rotor blade 4 whereby rotating the rotor. The expended working fluid then exits the motor via exit duct E.

The proposed preferred embodiments of the disclosed rotary engine have tremendous advantages in terms of energy and fuel efficiency. Bolonkin rotary engine has no crankshaft/connecting rod mechanism relating with its large inertial loads which cause a lot of friction heat between the piston and the cylinder wall in a two- or four-stroke reciprocal piston engine. The new rotary engine has a rotating rotor as its piston which does not suffer alternating dynamic loads present in the reciprocal piston engine.

The friction heat produced in Bolonkin rotary engine is minimal. As result, Bolonkin engine does not require a complicated lubrication and cooling system.

The ignition of the fuel mixture, when starting the engine, can be done by a simple combination of a battery and a glow plug. Since the fuel can be injected into the combustion chamber not in spurts but continuously, the disclosed rotary engine has very simple fuel system and simplified control system. Heavy fuels can be burned in the engine designs having an external combustion chamber, shown in FIG. 12*b*1, 12*b*2, and 12*b*3 and FIG. 12*c*, where combustion takes place at constant pressure and, depending on a volume size of the combustion chamber, combustion time can be increased many times, thus improving completeness of heavy fuel burning.

In comparison to a gas turbine, the Bolonkin rotary engine does not need to compress additional air for cooling the rotor blades, while the fuel efficiency of this new Bolonkin engine is significantly higher than the fuel efficiency of the gas turbine engines, even though the proposed rotary engine works on the same thermodynamic cycle as the gas turbine engine. In addition, compression efficiency of the rotary engine is higher than compression efficiency of the centrifugal or axle compressor used in the gas turbine engine.

We note one more important advantage of the disclosed rotary engine. A very high compression ratio of 50 to 80 can be attained, which translates to high fuel efficiency and reduction of fuel consumption by 20 to 30 percent. Such high degree of compression and fuel efficiency is impossible in the known reciprocal piston combustion engines in which high ratio of gas compression is limited by the connecting-rod material strength.

The separating valves in the disclosed rotary apparatus may have seals which are slightly touching the surface of the rotor and/or stator, hence friction heat in this engine is drastically reduced, which in turn simplifies the lubrication and cooling system. The Bolonkin engine is ideally suitable for ceramic lining of the surfaces in stator, rotor and separating valves which come into contact with hot combustion gasses. Ceramic isolation of hot engine internal surfaces will eliminate the need for or greatly simplify the traditional complicated system of lubrication and cooling lubrication of the rubbing surfaces of the stator, rotor, separating vanes, and separating valve seals can be provided by means of local oil-drop lubrication, or by means of oil-air aerosol flowing within internal space of the engine housing. No liquid cooling system would be required, and an air cooling system would suffice for the rotary internal combustion engine of the disclosed invention.

Compared with the traditional four stroke piston engine, all four cycles (suction, combustion, expansion, and ejection) of the invented engine are accomplished in one turn of the engine rotor.

Several other unique important advantages of the Bolonkin engine should also be noticed. Each of the preferred embodiments of the rotary apparatus has either a rotor and rotatable separating valves, or a rotor and sliding valves engaged in small-amplitude oscillating motion. Because the rotor blades do not move in radial directions, they cannot exert centrifugal pressure on the inside surface of the engine housing, whereby practically reducing friction heat in the engine, which in turn, permit the engine reach high revolution speed of 8,000 to 20,000 rpm, with specific power 2 to 3 times in excess of specific power of known carburetor and diesel engines. Moreover, in the engine variant with two separating valves, the engine performs two work cycles for each rotor turn, while a regular four-stroke piston engine requires two turns of the output shaft to complete one work cycle. This means that, for a given rotation speed the proposed rotary engine shall produce at least twice power or be two times smaller in volume than a four-stroke reciprocal engine of similar power. Moreover, given the same power, further reduction in overall size of the disclosed rotary apparatus/engine is due to the fact that the working volume of the proposed rotary engine occupies a circular cylinder, and not a straight cylinder as in a reciprocal piston engine.

The proposed engine will be 2 to 3 times smaller in size and weight than current commercial engines of equal power. By varying the volume of the engine combustion and expansion sections, it is possible even further to improve the efficiency of Bolonkin rotary engine, while reducing its fuel consumption and work noise. Maximum efficiency of Bolonkin engine is attained by satisfying such major technical condition as full expansion of the exhaust gases, reduced heat loss in cooling, reduced friction, improved completeness of fuel combustion, and increased revolution speed of the rotor. Actually, the disclosed engine works at maximum theoretically achievable level of fuel/energy efficiency.

In summary, compared to the reciprocal piston engines of the same power, Bolonkin rotary engine has numerous improvements including reduction of fuel consumption by 20 to 30 percent due to high compression ration and reduction of cylinder friction and cooling energy losses, reduction of atmospheric pollution by 20 to 30 percent due to reduction of fuel consumption by the same percentage, extremely simple design that reduces production cost 2 to 4 times, smaller overall dimensions and 3 to 6 times reduction in volume size, additional material/energy economy come from multiple (2 to 4 times) reduction in amount of the metal material required to build the engine, reduction in maintenance and service costs due to simplification in the engine construction, increase in reliability and durability. In a version with the external combustion chamber, the engine can work at constant pressure thermodynamic cycle and burn all kinds of gas turbines fuels. The engine allows for use of ceramic isolation of all parts that come into contact with hot gases, which further increase the engine efficiency and can facilitate simplification of design due to elimination or simplification of the cooling and lubricating system. Bolonkin engine fuel efficiency reaches 70 to 75 percent; and due to lower weight and simpler construction, cost of mass manufacturing of the proposed engine should be 2 to 4 times lower than of current commercial engines.

Having thus described preferred embodiments of Bolonkin rotary engine, it should now be apparent to those skilled in the art that certain advantages of the system have been achieved. It should also be appreciated by those skilled in the art that various modifications, adaptations, and alternative embodiments thereof may be made within the scope and spirit of the present invention.

Without further analysis, the foregoing will so fully reveal the essence of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in particular in the appended claims:

1. A rotary apparatus comprising:

a housing having an inner surface which is substantially annular, concave, toroid form;

said form has a cross section area limited by four straight lines, for example, a rectangle form;

a rotor rotatably mounted inside said housing, said rotor having a peripheral surface, a rotation axis, at last two rotor blades located on said peripheral surface of said rotor and extending substantially radial and outward from said peripheral surface of said rotor, each of said rotor blades is stationary relatively to said rotor;

said blades have a form limited by four straight lines, for example, a rectangle form;

at last two separating main valves peripherally disposed in said housing, each of said separating valves having a working edge sliding against said peripheral surface of said rotor;

a displacement volume equal to a volume of a space bounded by an inner surface of said housing, said peripheral surface of said rotor, and outer surfaces of valves; said displacement volume is partitioned by said main separating valves and by said rotor blades at last into four working sections: suck, compression, extension, and exhaustion;

said main valves have at least one slot, limited by straight lines, for example a rectangle form, appropriated to cross section of said main blade;

means for driving each of said main valves, for example: mechanical, hydraulic, pneumatic, electrical, electronically systems, and their combination;

means for coordinating passage of said rotor blades through said main separating valves, for example: mechanical, hydraulic, pneumatic, electrical, electronically systems, and their combination;

an inlet port through which a working fluid enters the rotary apparatus; and outlet port through which said working fluid exits the rotary apparatus, for example, an elementary ducks;

at least one bypass channel connected to said compression and extension sections by two bypass valves in ends of channel.

2. The rotary apparatus of claim 1, wherein each of said separating valves is a glass-shape separating valve rotatably mounted in said housing, said glass-shape separating valve having a closed end, a rotation axle extending outwardly from said closed end, an open end with smooth edge sliding substantially against said peripheral surface of said rotor, and at least one slot limited by straight lines, for example rectangle for rotatably passage of said rotor blades through said glass-shape separating valve.

3. The rotary apparatus of claim 2, wherein said valves disposed asymmetrically in said housing and located so that intake and compression sections have less volume than said expansion and exhaust sections.

4. The rotary apparatus of claim 2, wherein the open end of said glass-shape separating valve having less than 13 slits; and said rotor having less than 13 corresponding small curvilinear teeth disposed on said peripheral surface of said rotor in spaces between said rotor blades said slits being rotatably engaged by said curvilinear teeth of the rotor whereby passage of said rotor blades through said glass-shape separating valve is synchronized and coordinated with rotatable movement of the rotor.

5. The rotary apparatus of claim 1, wherein each of said separating valves having at least pressurizing seals located in said slits, slots, and edges.

6. The rotary apparatus of claim 5, wherein said bypass channel is located inside said rotor.

7. The rotary apparatus of claim 1, wherein said housing has at least one compression section, at least one expansion section, and at least one bypass channel connect said sections.

8. The rotary apparatus of claim 7, wherein said bypass channel has bypass valves on bypass channel ends.

9. The rotary apparatus of claim 8, wherein said bypass valves are created by a flanges of said stator, by a corresponding cavity of said rotor, and opening in said flange.

10. The rotary apparatus of claim 7, wherein said bypass channel is located outside of the housing.

11. The rotary apparatus of claim 10, wherein a combustion chamber is located in said bypass channel and has a fuel injector.

12. The rotary apparatus of claim 10, wherein said combustion chamber has a variable cross sectional area.

* * * * *